US008805721B2

(12) United States Patent
Rippe et al.

(10) Patent No.: US 8,805,721 B2
(45) Date of Patent: Aug. 12, 2014

(54) INSTANTIATION OF ASSET INSERTION PROCESSING ON MULTIPLE COMPUTING DEVICES FOR DIRECTING INSERTION OF ASSETS INTO CONTENT ON DEMAND

(71) Applicant: Canoe Ventures, Englewood, CO (US)

(72) Inventors: Christopher M Rippe, Lafayette, CO (US); Jonathan E. Farb, New York, NY (US); Thomas M. Moretto, Denver, CO (US); Timothy R Whitton, Parker, CO (US)

(73) Assignee: Canoe Ventures, Englewood, CO (US)

( * ) Notice: Subject to any disclaimer, the term of this patent is extended or adjusted under 35 U.S.C. 154(b) by 0 days.

(21) Appl. No.: 13/628,469

(22) Filed: Sep. 27, 2012

(65) Prior Publication Data
US 2014/0089969 A1    Mar. 27, 2014

(51) Int. Cl.
*G06Q 30/00* (2012.01)
*G06Q 30/02* (2012.01)
*H04N 21/472* (2011.01)
*G06F 17/30* (2006.01)
*H04N 7/10* (2006.01)
*H04N 7/173* (2011.01)
*G06F 7/00* (2006.01)
*G06F 12/00* (2006.01)
*H04N 21/81* (2011.01)
*H04N 7/16* (2011.01)

(52) U.S. Cl.
CPC ........ *G06Q 30/0244* (2013.01); *G06Q 30/0257* (2013.01); *H04N 21/47202* (2013.01); *G06F 17/30575* (2013.01); *G06F 17/30067* (2013.01); *G06Q 30/0251* (2013.01); *G06Q 30/0271* (2013.01); *G06Q 30/0277* (2013.01); *H04N 21/812* (2013.01); *H04N 7/165* (2013.01)

USPC .................. 705/14.43; 705/14.41; 705/14.49; 705/14.55; 705/14.67; 705/14.73; 725/34; 725/36; 725/87; 725/104; 707/610; 707/634; 707/821

(58) Field of Classification Search
CPC .......... G06Q 30/0264; G06Q 30/0273; G06Q 30/0272; G06Q 30/0242; G06Q 30/0251; H04N 21/23424; H04N 21/44016; H04N 21/2668; H04N 21/4331; H04N 21/25435; H04L 12/14
USPC ............... 725/34, 32, 36, 87, 104; 705/14.43, 705/14.41, 14.49, 14.55, 14.67, 14.73; 707/610, 634, 821
See application file for complete search history.

(56) References Cited

U.S. PATENT DOCUMENTS 6,215,534 B1   4/2001  Raj et al.
6,563,536 B1   5/2003  Rashkovskiy et al.
(Continued)

*Primary Examiner* — Hoang-Vu A Nguyen-Ba
(74) *Attorney, Agent, or Firm* — Duft Bornsen & Fettig

(57) ABSTRACT

Systems and methods presented herein provide for the directed insertion of assets in Content On Demand content across a plurality of computing devices. One system includes a database operable to maintain campaign data of the assets and an asset insertion decision system operable to instantiate on a plurality of computing devices and to periodically access the database to provide the campaign data to the instantiations of the asset insertion decision system on the computing devices. For example, the asset insertion decision system may establish a recording period in which each instantiation of the asset insertion decision system is operable to direct insertion of a portion of the assets in Content On Demand content selections upon request and to record the asset insertions between accesses to the database. The asset insertion decision system is also operable to process the asset insertions recorded by the instantiations to synchronize the campaign database.

18 Claims, 8 Drawing Sheets

(56) References Cited

U.S. PATENT DOCUMENTS

| | | |
|---|---|---|
| 6,616,533 B1 | 9/2003 | Rashkovskiy |
| 6,912,504 B1 | 6/2005 | Rashkovskiy |
| 7,082,254 B1 | 7/2006 | Rashkovskiy et al. |
| 7,162,700 B1 | 1/2007 | Rashkovskiy |
| 7,263,714 B2 | 8/2007 | Lowthert et al. |
| 7,337,463 B1 | 2/2008 | Rosenberg et al. |
| 7,383,563 B1 | 6/2008 | Rashkovskiy |
| 7,519,273 B2 | 4/2009 | Lowthert |
| 8,214,256 B2 * | 7/2012 | Riedl et al. .................. 705/14.61 |
| 2001/0056465 A1 * | 12/2001 | Aiso ............................ 709/203 |
| 2002/0095675 A1 | 7/2002 | Lowthert et al. |
| 2002/0100043 A1 | 7/2002 | Lowthert et al. |
| 2002/0100062 A1 | 7/2002 | Lowthert et al. |
| 2002/0126751 A1 | 9/2002 | Scheurich et al. |
| 2003/0023973 A1 * | 1/2003 | Monson et al. ................. 725/34 |
| 2003/0055729 A1 * | 3/2003 | Bezos et al. ..................... 705/14 |
| 2004/0189873 A1 * | 9/2004 | Konig et al. .................... 348/607 |
| 2004/0194130 A1 * | 9/2004 | Konig et al. ..................... 725/32 |
| 2004/0216170 A1 | 10/2004 | Rashkovskiy |
| 2004/0237102 A1 * | 11/2004 | Konig et al. ..................... 725/36 |
| 2007/0162951 A1 | 7/2007 | Rashkovskiy |
| 2009/0171784 A1 | 7/2009 | Morgan et al. |
| 2009/0304357 A1 | 12/2009 | Rashkovskiy et al. |
| 2009/0304358 A1 | 12/2009 | Rashkovskiy et al. |
| 2010/0153993 A1 * | 6/2010 | Konig et al. ..................... 725/34 |
| 2010/0251289 A1 * | 9/2010 | Agarwal et al. ................. 725/34 |
| 2011/0015975 A1 * | 1/2011 | Yruski et al. ................. 705/14.4 |
| 2011/0191802 A1 * | 8/2011 | Haberman et al. ............. 725/34 |
| 2012/0023522 A1 * | 1/2012 | Anderson et al. ............... 725/35 |
| 2012/0284747 A1 * | 11/2012 | Joao ................................ 725/34 |
| 2013/0097027 A1 * | 4/2013 | Wang et al. ................. 705/14.71 |

* cited by examiner

INSTANTIATION OF ASSET INSERTION PROCESSING ON MULTIPLE COMPUTING DEVICES FOR DIRECTING INSERTION OF ASSETS INTO CONTENT ON DEMAND

CROSS REFERENCE TO RELATED APPLICATIONS

This patent application is related to commonly owned and co-pending patent applications Ser. Nos. 13/628,324, 13/628,360, 13/628,381, and 13/628,447; hereafter the "related patent applications"), the contents of each of which are incorporated by reference.

FIELD OF THE INVENTION

The invention relates to the field of Content On Demand (COD) systems and more specifically to the instantiated insertion of assets, such as advertisements, into COD content and to the synchronization of data relating to asset insertion.

BACKGROUND

Television networks, such as the American Broadcasting Company (ABC), the Columbia Broadcasting Company (CBS), and the National Broadcasting Company (NBC), have for years broadcast television shows to the masses as a means for generating revenue through advertising. For example, these networks produce television shows and then seek out sponsors to advertise on the shows. The television shows, or "content", have designated timeslots in which the sponsors' advertisements, or "assets", are inserted. The content and the inserted assets are then broadcast by the television networks, or "content providers", to the public over federally licensed communication airways, occasionally referred to as linear video distribution.

This "shotgun" approach to advertising proved to be very successful in the beginning. However, as the number of advertisers wishing to sell their goods and services substantially increased, television evolved into a much more complex system of communications. For example, cable television providers and satellite television providers now serve as an intermediary between the content providers and the intended public audience. And, the number of content providers has increased accordingly. In this regard, many members of the general public have signed on as customers of the cable/satellite television providers so as to receive a broader availability of content.

Because the market for content consumption has grown, the number of television providers has also grown. And, because each of these providers has its own method of content delivery, the manner in which the content and assets are delivered to the customers has become increasingly complex. Generally, the content providers deliver the content to the television providers with instructions to insert various national assets into the content at certain times. For example, if a company wishes to run a national advertisement campaign targeting a certain television show associated with a particular demographic, the company may purchase one or more timeslots, or "placement opportunities", within that television show from the content provider to air assets advertising the goods and services of the company. The content provider then provides the content to each of the television providers with directions to insert the assets within the timeslots purchased by the company.

The television providers may also have certain timeslots available for inserting certain local assets. For example, a television provider may have "headends" configured in various communities to distribute content to their customers located therein. Each headend receives content from the content providers with various designated timeslots for inserting assets into the content. Some of those timeslots may be designated for local ads where companies within the service area of the headend wish to advertise. These companies purchase those timeslots from the television provider for insertion of their assets to expose the customers to their advertising at the more local level.

As complex as the cable/satellite television has become, certain devices have come along to change and/or circumvent these forms of marketing altogether. The digital recorder, such as that produced by Tivo, is one example of a means for avoiding the asset insertions of marketing strategists. With the digital recorder, the television providers' customers are able to digitally record entire episodes of content and view that content at their leisure, as opposed to a time established by the content providers. However, these customers could also use the digital recorders to fast-forward or skip through the assets without viewing them, much to the dismay of the asset owners/marketers.

In response, television providers started providing content on a "Content On Demand" (COD) basis, occasionally referred to as nonlinear video distribution. In COD, the content provider delivers the content to the television provider which in turn maintains the content for subsequent and individual distribution to their customers. Thus, a customer may select a desired content through a set-top box (STB) or other device and watch that content at the customer's leisure. This COD content is also typically configured with timeslots where assets may be inserted. However, marketing strategists have not been able to determine the effectiveness of asset insertion in COD content.

SUMMARY

Systems and methods presented herein provide for the directed insertion of assets in Content On Demand content across a plurality of computing devices. In one embodiment, a system includes a database operable to maintain campaign data of the assets and an asset insertion decision system operable to instantiate on the computing devices and to periodically access the database to provide the campaign data to the instantiations of the asset insertion decision system on the computing devices. For example, the asset insertion decision system may operate on a computing device to provide the functionality of the asset insertion decision systems of the related applications on various other computing devices. The asset insertion decision system may establish a recording period in which each instantiation of the asset insertion decision system is operable to direct insertion of a portion of the assets in Content On Demand content selections upon request and to record the asset insertions between accesses to the database. The asset insertion decision system is also operable to process the asset insertions recorded by the instantiations to synchronize the campaign database.

In one embodiment, each instantiation of the asset insertion decision system is operable to process assets for insertion in the COD content selections to qualify the assets for insertion in the COD content selections, to rank the assets for insertion in the COD content selections, and to resolve conflicts of the assets selected for insertion in the COD content selections, or a combination thereof. The asset insertion decision system is further operable to balance the processing of the instantiations across the computing devices. For example, each instantiation may perform all or a portion of the qualification, ranking, and conflict resolution processing. The asset insertion decision system balances the processing across multiple computing devices. In some embodiments, the instantiations are configured at the headend such that a COD system can send a request for asset insertion directly to an instantiation of the asset insertion decision system.

In qualifying the assets, at least one of the instantiations of the asset insertion decision system may be operable to process a request for asset insertions in a COD content selection by a customer premises equipment to extract information of the COD content selection including a provider of the COD content selection, to communicate with the provider of the COD content selection to validate the request, to analyze the information of the COD content selection to validate assets for insertion in the COD content selection, and to remove one or more of the assets from insertion selection based on the validation of the assets.

In ranking the assets, at least one of the instantiations of the asset insertion decision system is operable to process a request for asset insertions in a COD content selection by a customer premises equipment, to identify assets that are available for insertion in the COD content selection, to determine values of the available assets to a provider of the COD content selection, to rank the available assets based on the determined values, and to direct the insertion of the one or more assets in the selected COD content based on the rank of the available assets.

In resolving conflicts between the assets, at least one of the instantiations of the asset insertion decision system may be operable to process a request for asset insertions in a COD content selection by a customer premises equipment, to identify asset timeslots within the COD content selection from the request, to determine an asset separation criteria from assets, to determine conflicts among the assets based on the asset separation criteria to remove conflicting assets, and to select at least a portion of the remaining assets for insertion in the asset timeslots of the COD content selection.

The various embodiments disclosed herein may be implemented in a variety of ways as a matter of design choice. For example, the embodiments may take the form of physical machines, computer hardware, software, firmware, or combinations thereof. In another embodiment, a computer readable medium is operable to store software instructions for processing directed insertion of assets into content through instantiations of a COD asset insertion decision system on multiple systems. These software instructions are configured so as to direct a processor or some other processing system to operate in the manner described above.

Additionally, although the term "headend" generally suggests the distribution center or office of a cable television operator or MSO, the term is not intended to be so limited. The term headend as used herein is any system operable to deliver content to a viewer (e.g., a customer or user of the CPE). For example, the term headend may encompass internet servers delivering COD content when selected by a user from a device, such as a computer, a tablet, or a mobile phone. A headend may also refer to a telecom provider that distributes content to mobile phones and other devices. Also, the term "asset", as used herein, includes any type of media for which an owner desires promotion. Examples of such include traditional television commercials, advertisements, streaming video commercials, promotional materials, marketing information, and the like. The term "content", as used herein is any type of media, such as audio and/or video, in which assets may be inserted. For example, the content operable within the COD delivery systems described herein may be streamed Internet audio/video, analog cable television feeds, digital cable television feeds, digital satellite television feeds, or digital satellite radio feeds. Thus, the content of the COD described herein is intended to encompass Video on Demand (VOD) found in modern cable television as well as pay-per-view (PPV) delivered by both modern cable television and satellite television.

Other exemplary embodiments are described below.

BRIEF DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION OF THE DRAWINGS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below.

Figure 1:
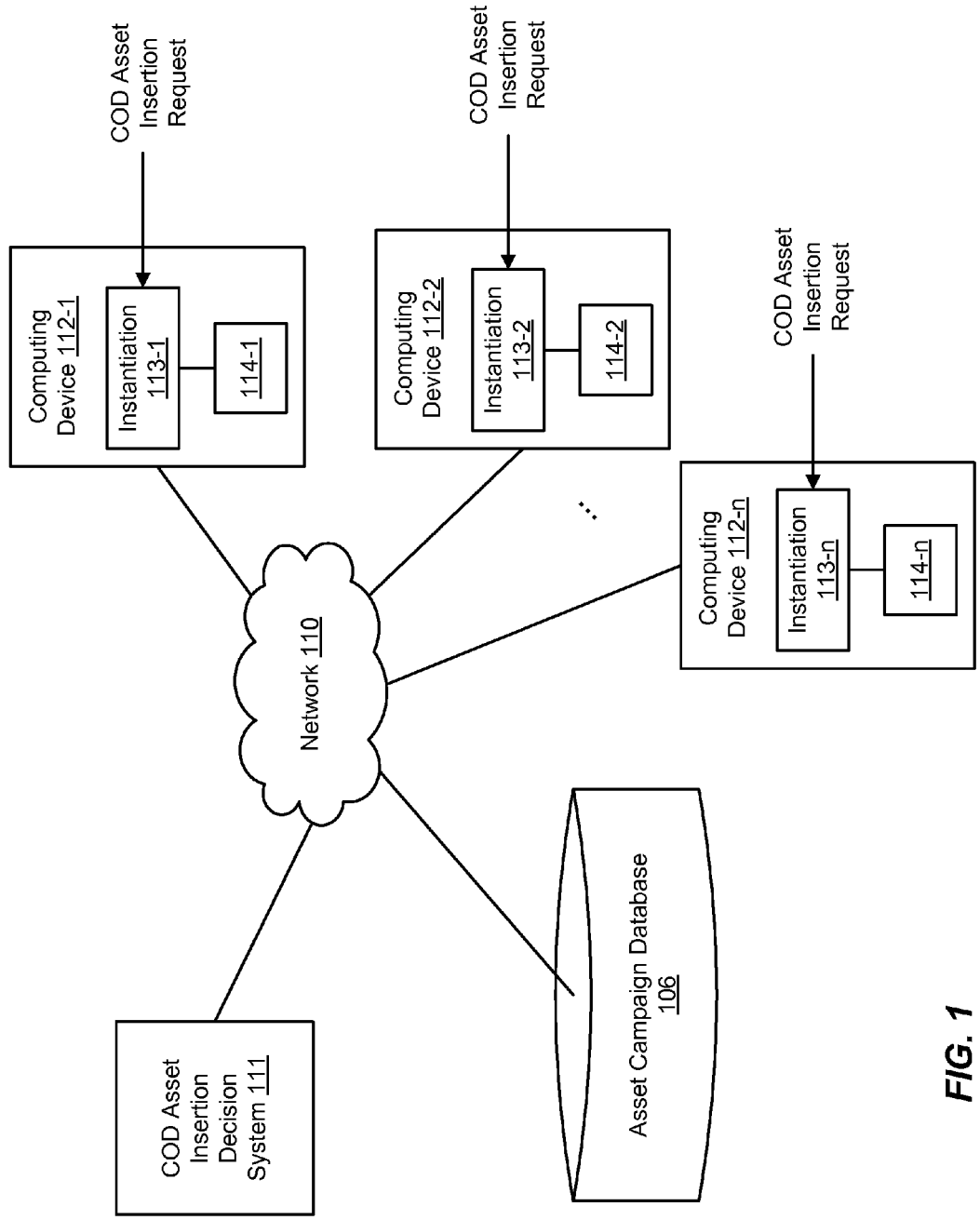
FIG. 1 is a block diagram of an exemplary COD asset insertion decision system.

FIG. 1 is a block diagram of an exemplary COD asset insertion decision system 111. The COD asset insertion decision system 111 is any system device, software, or combination thereof operable to instantiate on a plurality of computing devices 112-1-*n* to direct asset insertions into COD content (where "n" is merely intended to represent an integer greater than 1 and not necessarily equal to any other "n" reference number shown and described herein). For example, the COD asset insertion decision system 111 may be operable on a computing device to communicate with other computing devices 112 through the network 110 to provide the functionality of the asset insertion decision system 111 shown and described below and in the related applications to each instantiation 113. Each instantiation 113 of the COD asset insertion decision system 111 is thus operable within a computing device 112 to direct the asset insertions based on a COD asset insertion request from a headend (shown and described below). Each instantiation 113 may record the asset insertions in a list 114 which may be used by the COD asset insertion decision system 111 to synchronize an asset campaign database 106.

The asset campaign database 106 is any system, device, software, or combination thereof operable to monitor the campaigns of the assets as influenced by the assets being inserted in the selected COD content. For example, the COD asset insertion decision system 111 may access the asset campaign database 106 to determine a health of campaigns (e.g., a percentage of assets inserted based on the number of required assets in the campaign). The COD asset insertion decision system 111 may use that campaign data to compute, among other things, rankings of the assets that provide value to a provider of the selected COD content (e.g., a cable television headend). Afterwards, the COD asset insertion decision system 111 may direct one or more of the ranked assets for insertion into the selected COD content.

The asset campaign database 106 may record the actual insertions of the assets within each of the various COD content selections. For example, the asset campaign database 106 may log the actual insertions of the assets to compute/maintain the data relating to the campaign health of the assets. For example, if an asset campaign dictates that a particular asset is to be inserted into COD content 100 times within a day, and the asset has been inserted into various COD content selections 60 times during that day, the asset campaign database 106 may show that the campaign is 60% complete and still eligible for COD content insertions. Each time that asset is inserted into a COD content selection, the asset campaign database 106 may recompute the campaign data associated with the asset to ensure that the asset is not further placed after meeting the campaign requirements. Examples of campaigns, campaign items, assets, and their associated data and computations are shown and described in the related patent applications.

In some instances, the computation of campaign data can be quite time-consuming and processor intensive. For example, when the COD asset insertion decision system 111 instantiates on numerous computing devices 112, each instantiation 113 of the COD asset insertion decision system 111 may direct insertion of assets into thousands or even hundreds of thousands of COD content selections at any given time. Thus, the link between a COD asset insertion decision system 111 and the asset campaign database 106 may be overwhelmed with data requests. And, since each time an asset is inserted into a particular COD content selection, the campaign data is typically recalculated substantially increasing the amount of processing being performed by so many requests.

To decrease the amount of processing related to so many COD content insertion requests, each instantiation 113 provides a means for caching data of the directed insertions in an asset insertion list 114. This caching means alleviates the accesses to the asset campaign database 106 by the COD asset insertion decision system 111 and allows for the periodic synchronization of the database 106.

The network 110 may be any type of communication link capable of providing communication between the COD asset insertion decision system 111, the asset campaign database 106, and the instantiations 113-1-n. For example, the network 110 may be implemented as a virtual private network via the Internet. The COD asset insertion decision system 111 may communicate through the network 110 to the instantiations 113 to provide campaign data of the asset campaign database 106. Each instantiation 113 may then use the campaign data to direct asset insertions in COD content as requested. After some time, the COD asset insertion decision system 111 may retrieve the lists 114-1-n from each instantiation 113 through the network 110 to periodically synchronize the asset campaign database 106, thereby alleviating processor intensive accesses to the database 106 and/or computations of campaign data by the database 106.

Figure 5:
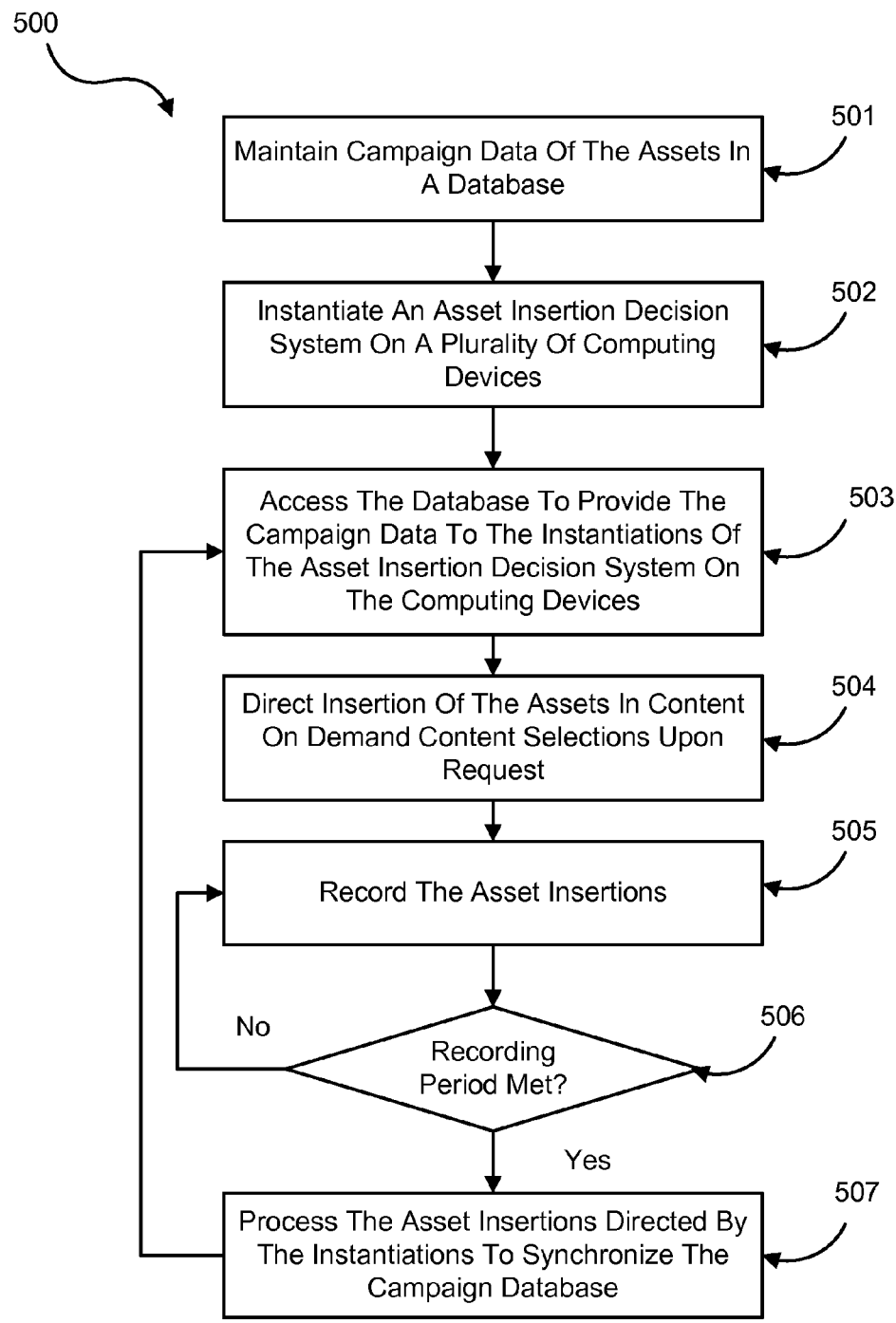
FIG. 5 is a flowchart of an exemplary method operable with the COD asset insertion decision system.

An exemplary process relating to the operation of the COD asset insertion decision system 111 and its instantiations 113 is shown and described in the flowchart of FIG. 5. However, before delving into specific aspects of the COD asset insertion decision system 111 and its instantiated operability on various computing devices 112, a discussion of the functionality of the COD asset insertion decision system 111 is first presented.

Figure 2:
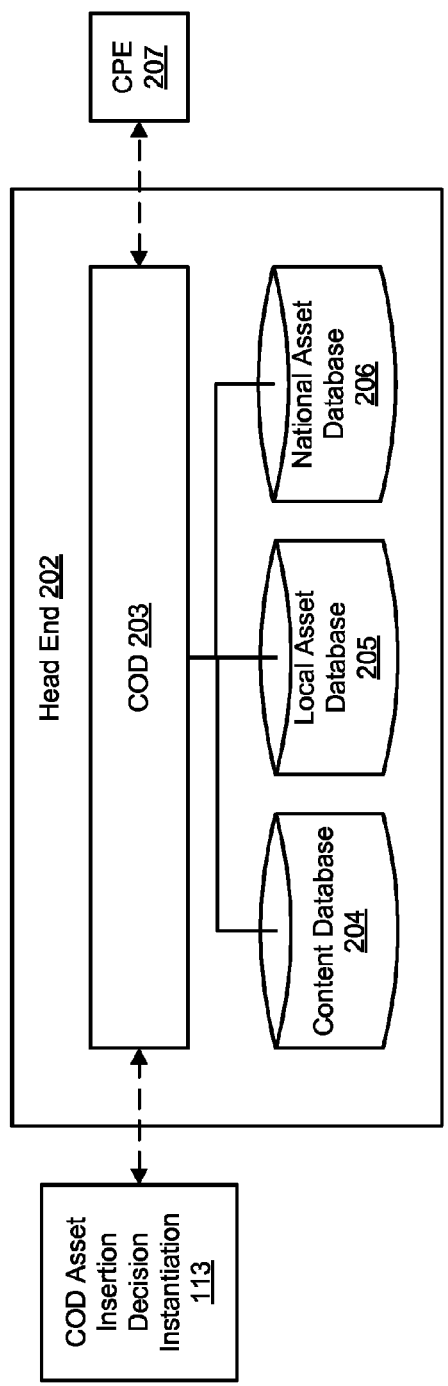
FIG. 2 is a block diagram of an instantiation of the COD asset insertion decision system instantiation operable with a COD system of a headend.

In FIG. 2, a block diagram of an exemplary COD asset insertion decision system 111 operable with a COD system 203 (also known as a "COD back office system") of a headend 202 is illustrated. The headend 202 is generally any system operable to receive content for processing and distribution to a CPE 207 (e.g., over a cable television infrastructure or from satellite). For example, the headend 202 may receive content from content providers over television signals for distribution to the customers of a cable television provider via the customer premise equipment (CPE) 207, such as a set-top box (STB), a gaming console, a smart phone, an electronic tablet, a computer, or the like.

To provide the COD content, the headend 202 includes a COD system 203 that is operable to provide content to the CPE 207 when desired by the customer. For example, the headend 202 may receive the content from the content providers and maintain that content within a content database 204. The headend 202 may also maintain local assets in a local asset database 205 and national assets in a national asset database 206. When a particular content is selected by the user of the CPE 207, the COD 203 accesses the content database 204 to retrieve the selected content and deliver that content to the CPE 207. In this regard, the COD 203 is any system or device that is operable to deliver video content to the CPE 207 when directed by the CPE 207. The COD asset insertion decision system 202 is any system or device that is operable to direct insertion of assets into the content provided to the CPE 207 by the COD 203. The databases 204, 205, and 206 are any systems or devices operable to store and maintain data, audio, and/or video for subsequent distribution to the CPE 207. For example, the databases 204, 205, and 206 may be operable within a computer system that stores the video and audio (e.g., MPEG) content and assets such that they may be accessed by the COD 203 and delivered to the CPE 207 when desired by the user of such.

Figure 3:
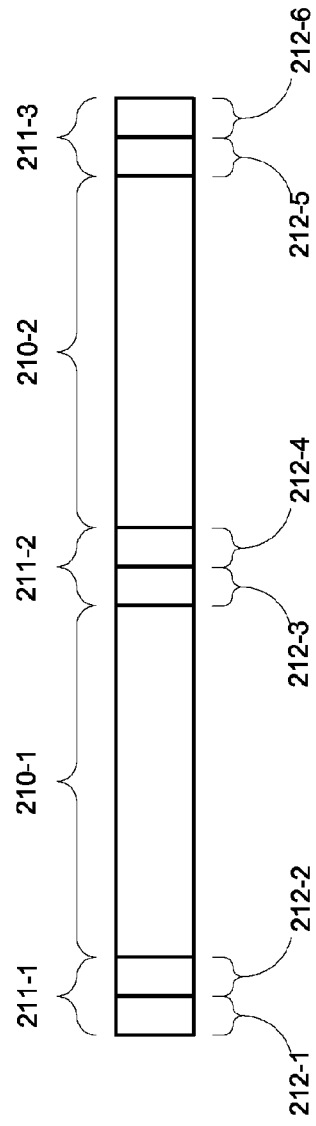
FIG. 3 is an exemplary timing diagram of content interlaced with asset timeslots.

To illustrate the insertion of assets into content, FIG. 3 shows an exemplary timing diagram of content 210 interlaced with asset timeslots 211, also known as "break positions". When the COD 203 receives a message from the CPE 207 for the content 210, the COD 203 retrieves the content 210 from the content database 204. The content 210, in this embodiment, is divided into two segments 210-1 and 210-2 with timeslots 211 disposed at the front end of the content 210-1 (i.e., timeslot 211-1 at the pre roll position), in between the content segments 210-1 and 210-2 (i.e., timeslot 211-2 at the mid roll position), and at the end of the content segment 210-2 (i.e., timeslot 211-3 at the post roll position). Each timeslot 211 is divided into two asset placement timeslots 212, or "placement opportunities", each of which being capable for accepting an asset that is typically, but not always, 30 seconds in duration. Thus, a placement opportunity is generally a subset of time of a particular timeslot 211. Each instantiation 113 of the COD asset insertion decision system 111 directs the COD 203 to insert the assets according to a particular ranking that provides value for an MSO and/or a content provider (e.g., monetary value, enhanced relationships with asset providers, etc.). In this regard, the COD asset insertion decision system 111 may direct the COD 203 to select assets from the national asset database 206 and/or the local asset database 205 for insertion into the asset timeslots 212-1-212-6 based on the ranking provided by the COD asset insertion decision system 111.

The instantiations 113-1-*n* of the COD asset insertion decision system 111 are not intended to be limited to merely providing direction to the COD 203 for selection of various assets in a local asset database 205 and the national asset database 206. In one particular embodiment, each instantiation 113 is operable to provide a portion of the processing that directs the COD 203 to insert the assets in the COD content. For example, the COD asset insertion decision system 111 may be operable to qualify assets for insertion into COD content, rank the qualified assets for insertion, and then resolve conflicts between ranked assets prior to insertion. This functionality of the COD asset insertion decision system 111 may be divided amongst various instantiations 113 to balance the processing of their respective computing devices 112. In other words, the COD asset insertion decision system 111 may be operable to balance the COD asset insertion decision processing on multiple computing devices 112.

Additionally, the instantiations 113-1-*n* of the COD asset insertion decision system 111 may be communicatively coupled to content providers so as to receive instructions regarding various campaigns from asset providers on a national level. Alternatively or additionally, the instantiations 113 may be communicatively coupled to asset providers to receive and direct insertion of the assets therefrom into the COD content 210. In some embodiments, such as those illustrated below, an instantiation 113 of the COD asset insertion decision system 111 may be configured with the headend 202 to direct insertion of assets into the asset timeslots 212-1-212-6.

Also, the invention is not intended be limited to any particular number of content segments 210 or any particular number of asset timeslots. In fact, an asset timeslot 212 may be subdivided for insertion of multiple assets. For example, television commercials are typically 30 seconds in length. Occasionally, however, asset providers reduce the material of certain assets to reduce the overall duration of a particular asset (e.g., by removing material from a 30 second commercial to reduce it to a 15 second commercial). Accordingly, a 30 second asset timeslot 212 may be configured to accept insertions of two 15 second assets.

It should also be noted that the decisions regarding the direction of asset insertions occur quite rapidly. For example, each instantiation 113 of the COD asset insertion decision system 111 may be operable to make asset insertion decisions for a plurality of headends 202. And, each headend 202 may be operable to provide COD content to a plurality of CPEs 207 at any given time, possibly thousands or more. Thus, when a COD content selection is made by a particular CPE 207, each instantiation 113 of the COD asset insertion decision system 111 responds in substantially real time to ensure that the COD 203 has ample time to retrieve and insert the assets while processing the content selected by the CPE 207.

Figure 4:
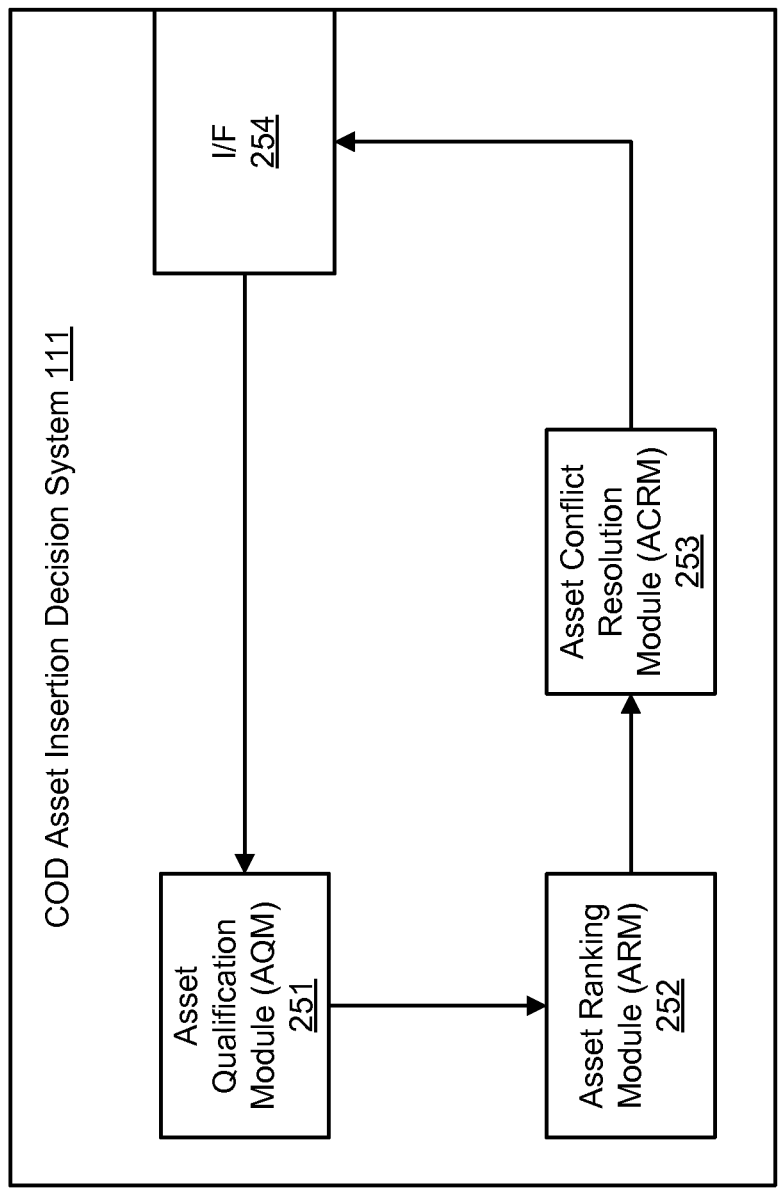
FIG. 4 is block diagram of an exemplary COD asset insertion decision system.

FIG. 4 is a more detailed block diagram of the exemplary functionality and operating modules of the COD asset insertion decision system 111 that may be instantiated on the computing devices 112-1-*n*. This includes an interface 254, an asset qualification module (AQM) 251, an asset ranking module (ARM) 252, and an asset conflict resolution module (ACRM) 253. The interface 254 is any device or system operable to receive information pertaining to a content selection by a CPE 207 such that the COD asset insertion decision system 111 may direct asset insertion into the selected content. In this regard, the interface 254 may also be operable to transfer information to the COD 203 to direct the COD 203 to insert certain assets from the national asset database 206 and/or the local asset database 205.

The AQM 251 is any device or system operable to communicate with the interface 254 to initially qualify assets for insertion within the content. The AQM 251 may exclude certain assets from insertion into the content selected by the CPE 207. The ARM 252 is any device or system operable to rank the remaining assets (i.e., those not already excluded by the AQM 251) for insertion into the content 210. The ACRM 253 is any device or system operable to remove any ranked assets from insertion into the content 210 based on conflicts between assets. For example, the ACRM 253 may determine that assets from certain advertisers conflict with one another (e.g., Coke and Pepsi). Accordingly, the ACRM 253 may be operable to prevent assets from these advertisers from being inserted within a same timeslot 211 or even within a same content 210.

Initiation of the COD asset insertion begins when a CPE 207 selects a particular content provided by the headend 202. The CPE 207 transfers a content request to the COD 203 which in turn retrieves the content from the content database 204. The COD 203 may also retrieve active campaigns from the national asset database 206 and/or the local asset database 205. For example, each asset provider may generate an advertising campaign with one or more campaign items. Each of these campaign items may be associated with one or more assets of the asset provider designating the desired time, date, content, audience/demographic, etc., for which the assets are to be inserted into selected COD content. The COD 203 may retrieve the active campaigns of the asset providers and generate an asset insertion request for the AQM 251 of the COD asset insertion decision system 111.

Upon receiving the request, the AQM 251 may determine certain parameters relating to the placement of the assets. For example, the AQM 251 may determine durations of the assets and various placement opportunities for the assets (i.e., appropriate timeslots within the selected content). The AQM 251 may also process the active campaigns to determine their eligibility within the content to generate a list for the ARM 252 such that the ARM 252 may rank and select eligible campaigns from that list. In doing so, the AQM 251 may exclude certain campaigns from the list based on various criteria, such as whether the asset provider and/or the asset itself is valid and whether the insertion opportunities themselves are valid.

Once the ARM 252 receives the eligible campaign list, the ARM 252 ranks the campaigns and their various assets for insertion into the content selected by the CPE 207. The ARM 252 may rank the campaigns based on, among other things, their value to the content provider and/or the television provider, the strategy of the campaign, and the priority of the campaign. The ranked list of eligible campaigns is then generated and transferred to the ACRM 253 which determines whether any conflicts exist among the ranked campaigns. The ACRM 253 excludes certain campaigns from insertion when they conflict with others in the content selected by the CPE 207. For example, when one campaign conflicts with another campaign in the list for a particular selected content, the asset of the higher ranked campaign may be inserted into the content effectively excluding the lower-ranked campaign from that content.

Once the ACRM 253 removes conflicts from the ranked list of possible campaigns, the ACRM 253 transfers the final placement of the assets within the content to the COD 203, which in turn inserts the assets into the timeslots of the selected content. The COD 203 retrieves the assets from the local asset database 205 and/or the national asset database 206 for insertion of the assets into the selected content. With the assets inserted into the selected content, the COD 203 transfers the content and assets to the CPE 207 for presentation to the user thereof.

After the content is delivered to the CPE 207 with the inserted assets, the COD asset insertion decision system 111 reports the insertion (e.g., to the headend 202, the content providers, and/or the asset providers) such that the asset campaign database 106 can recompute and/or synchronize campaigns for another/subsequent content selection by a CPE 207. Examples of the various components and operations of the COD asset insertion decision system 111 are shown and described in the related patent applications.

It should be noted that each instantiation 113 may include any number of the modules illustrated in FIG. 4. For example, in one embodiment, an instantiation 113 may be operable to perform a portion of the processing on behalf of the COD asset insertion decision system 111 while one or more other instantiations 113 may perform the remaining processing. In this regard, the COD asset insertion decision system 111 may balance processing across multiple computing devices 112. Alternatively or additionally, each instantiation 113 may perform the functionality of all of the modules shown in FIG. 4 and individually direct asset insertions in COD content selections. The COD asset insertion decision system 111 may balance this processing by controlling the routing of COD asset insertion requests to various instantiations 113 and their respective computing devices 112. Accordingly, the invention is not intended to be limited to any particular amount or type of processing performed by each instantiation 113.

An exemplary method operable with the asset insertion decision system 111 and its respective instantiations 113 is illustrated in the flowchart 500 of FIG. 5. Operation begins with the asset campaign database 106 maintaining campaign data of the assets, in the process element 501. The COD asset insertion decision system 111 instantiates on a plurality of computing devices 112-1-*n*, in the process element 502. In this regard, the COD asset insertion decision system 111 provides some or all of the functionality of the system 111 to the instantiations 113 on the computing devices 112-1-*n* such that COD asset insertion requests may be received by the instantiations 113-1-*n* and acted upon to direct asset insertions into COD content selections.

The COD asset insertion decision system 111 periodically accesses the database 106 to provide the campaign data therein to the instantiations 113-1-*n*, in the process element 503. With this information, the instantiations 113-1-*n* implement all or a portion of the functionality of the COD asset insertion decision system 111 to direct the insertion of the assets in COD content selections upon request, in the process element 504. For example, each instantiation 113 may be operable to receive COD asset insertion requests and then direct insertion of assets into COD content selections based on those requests. Thus, each instantiation 113 may be responsible for a portion of the overall number of assets inserted into COD content selections. Each instantiation 113 may perform all or a portion of the processing related to any single asset insertion in any COD content selection. As discussed above, the COD asset insertion decision system 111 may balance the processing across the instantiations 113.

One or more of the instantiations 113-1-*n* records the asset insertions in the list(s) 114, in the process element 505. For example, the COD asset insertion decision system 111 may establish a recording period for which the instantiations 113-1-*n* record the asset insertion. The COD asset insertion decision system 111 may provide the campaign data of the asset campaign database 106 to the instantiations 113-1-*n* and then direct the instantiations 113-1-*n* to direct the asset insertions during the recording period. Once a recording period has been reached, the COD asset insertion decision system 111 retrieves the lists 114-1-*n* from the instantiations 113-1-*n* and accesses the asset campaign database 106 to synchronize the asset campaign database 106 with the asset insertion data recorded the lists 114-1-*n*, in the process element 507. The COD asset insertion decision system 111 may then provide this refreshed campaign data to the instantiations 113-1-*n* for the next recording period, thereby alleviating the number of accesses to the asset campaign database 106 and/or the number of computations of campaign data that the asset campaign database 106 needs to undertake. The recording period is generally a number of asset insertions and/or a recording duration that may be selected as a matter of design choice.

Additionally, the COD asset insertion decision system 111 and/or the instantiations 113 thereof may be operable to receive information from the headend 202 indicative of actual views of the inserted assets. For example, the headend 202 may be operable to access a CPE 207 to determine when a COD content selection is stopped such that a portion of the asset insertions are not seen by the viewer of the content selection. This information may be transferred back to the COD asset insertion decision system 111 such that the campaign data of those non-viewed assets can be compensated or corrected. In other words, when assets are inserted into COD content selections and they are not viewed because of some action on the part of the viewer, such as stopping or fast forwarding the COD content selection, the campaigns of those assets should not be influenced. Accordingly, the asset insertion decision system 111 may take this information into consideration to synchronize the asset campaign database 106.

Figure 6:
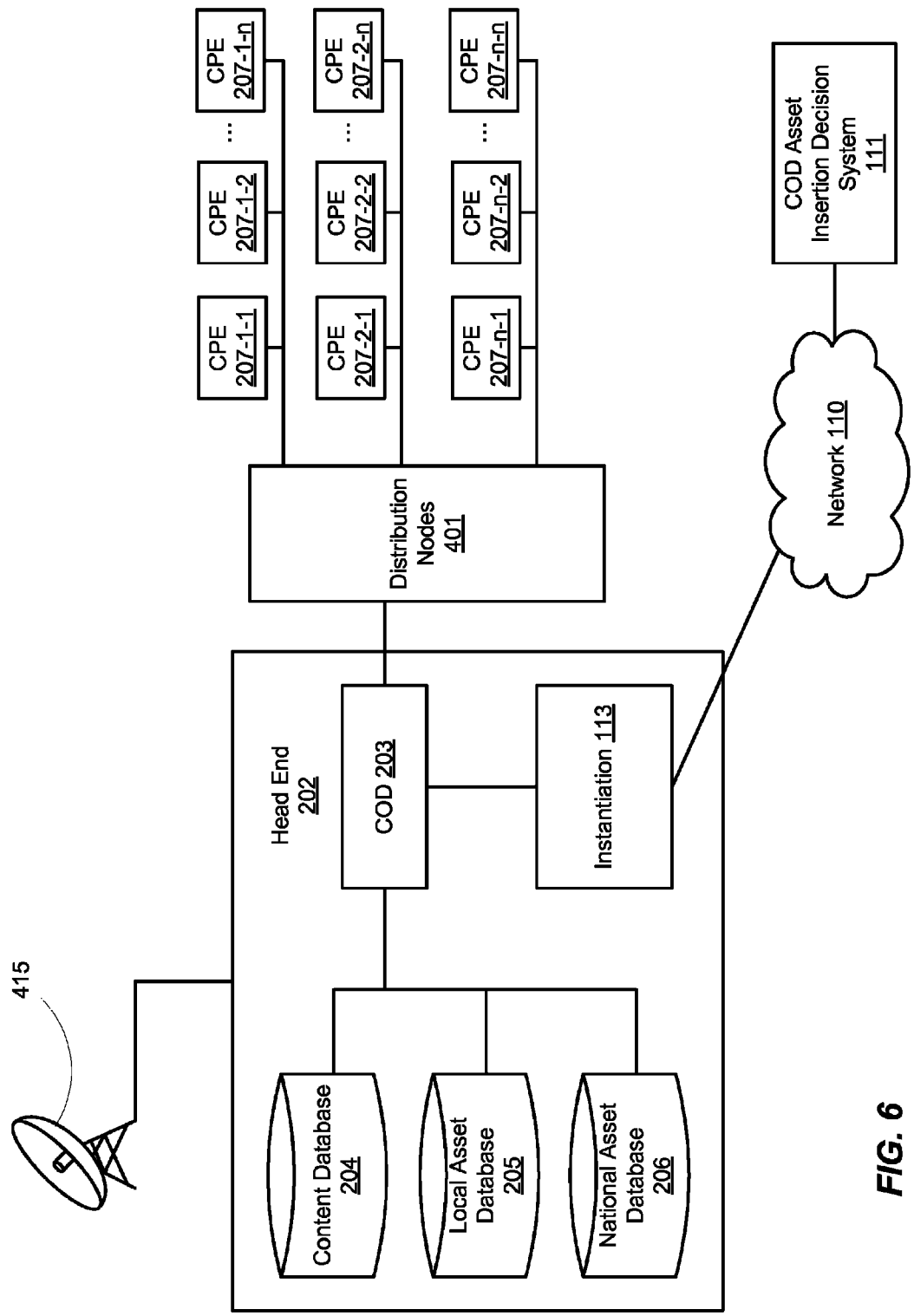
FIGS. 6-8 are block diagrams illustrating various exemplary embodiments of the COD asset insertion decision system.
Figure 7:
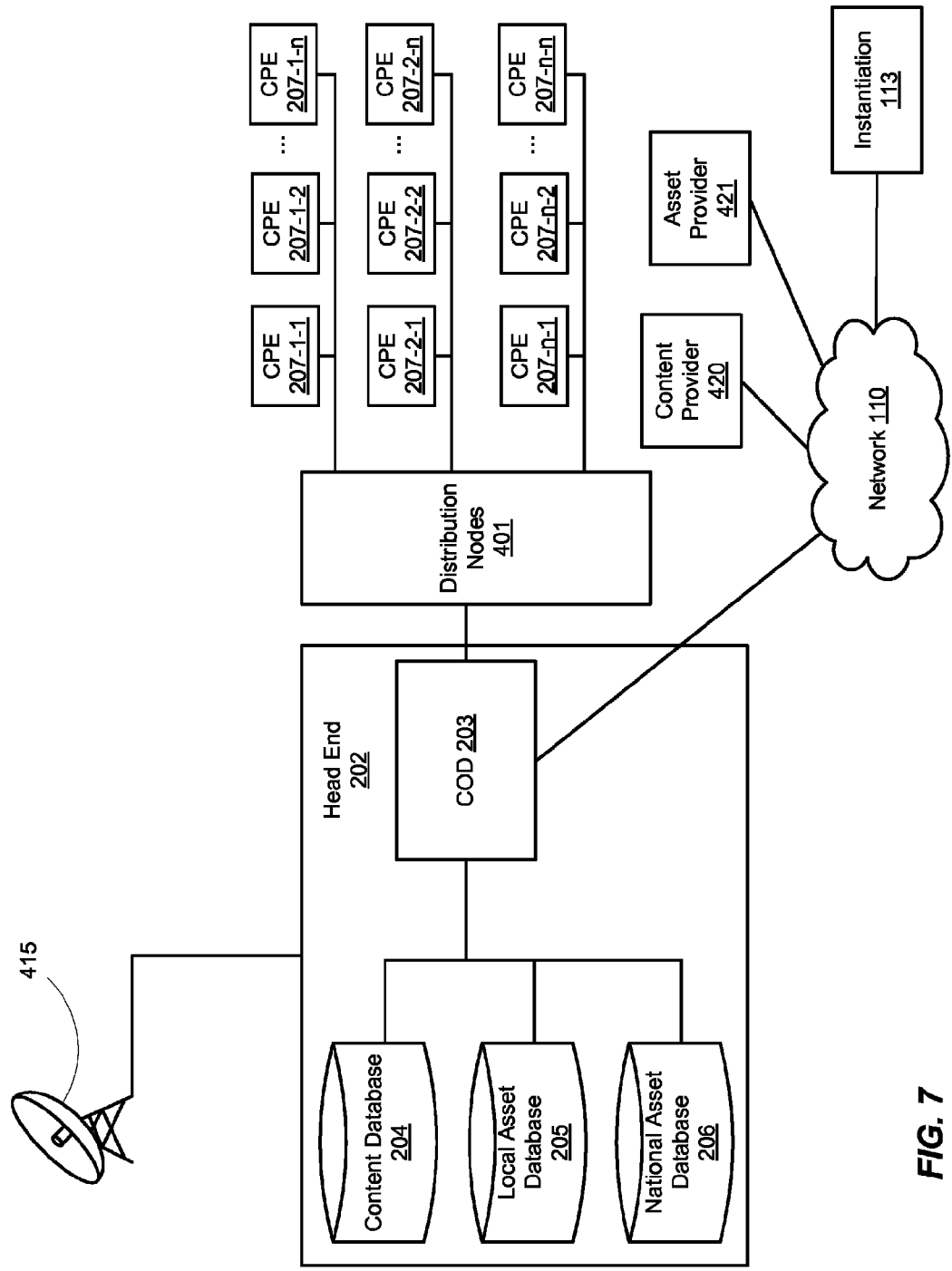
Figure 8:
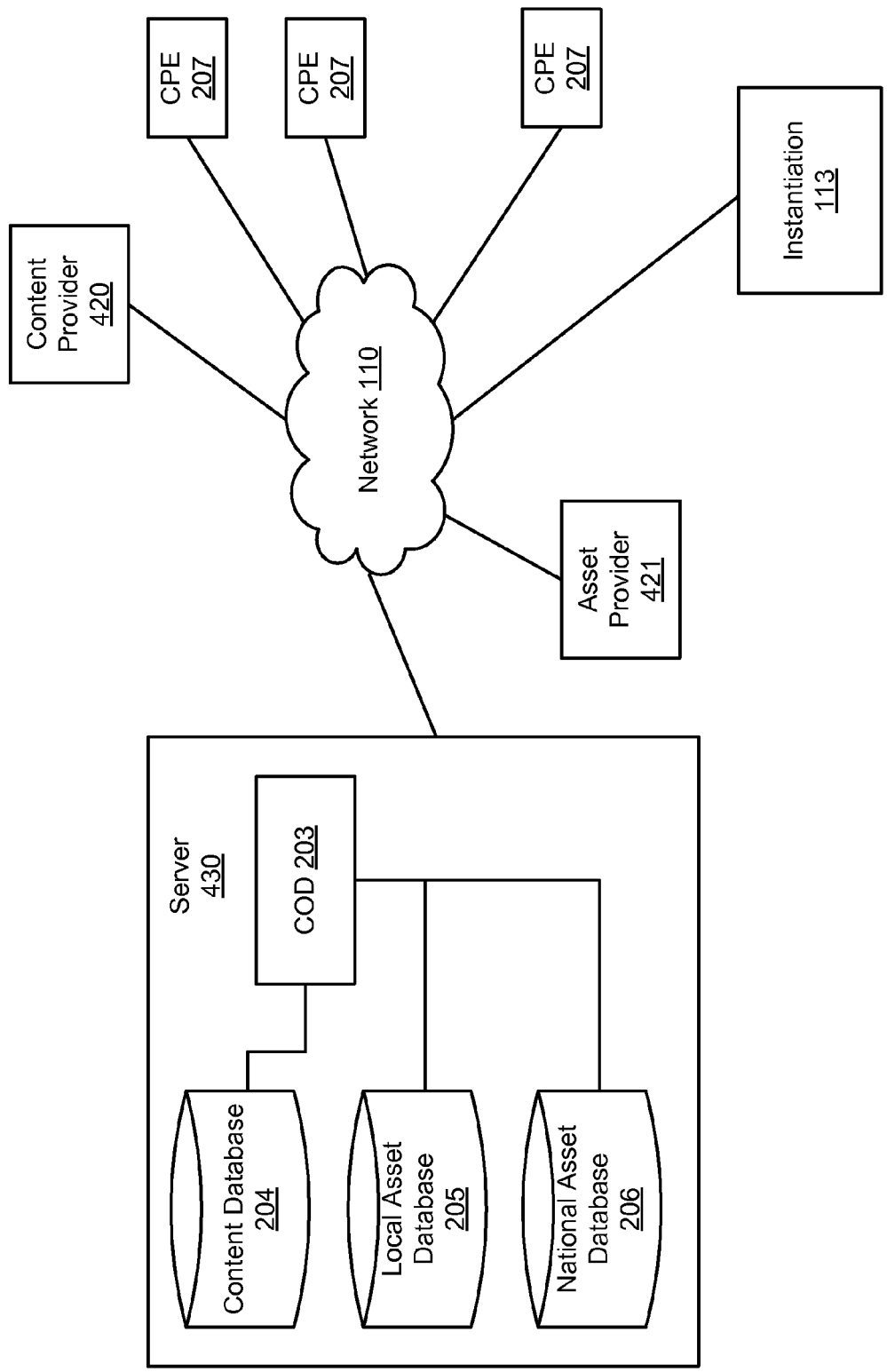

FIGS. 6-8 are block diagrams illustrating various exemplary embodiments of the COD asset insertion decision system 111 and the instantiations thereof. In FIG. 6, an instantiation 113 of the COD asset insertion decision system 111 is configured within the headend 202 to retrieve assets from the local asset database 205 and/or the national asset database 206 for insertion into COD content. For example, the headend 202 may receive content from a communication link such as the satellite dish 415. The headend 202 may store that content within the content database 204 for distribution to various CPEs 207-1-1-207-*n-n* when so directed. The headend 202 may be communicatively coupled to one or more distribution nodes 401 to distribute content to the CPEs 207.

Content within the content database 204 that is available to the CPEs 207 is presented to the CPEs through a programming menu from the headend 202. For example, the headend 202 provides a signal to the CPEs 207 via the distribution nodes 401 containing information relating to programming, available COD content, date and time, CPE firmware instructions and updates, etc. The CPE 207 processes the signal and displays much of this information to the user via some type of display module, such as a television or a computer monitor (not shown). A user of the CPE 207 typically navigates through the information via a remote control of the CPE 207. In this regard, the user may retrieve a menu of available COD content within a content database 204 and select a desired content. That content selection is transferred to the COD 203 of the headend 202 via the distribution nodes 401. The COD 203 then retrieves the selected content from the content database 204 for playback to the selecting CPE 207, generally after verification that the selecting CPE 207 is indeed a valid customer of the headend 202. The instantiation 113 is communicatively coupled to the COD 203 to process the content selection of the CPE 207 and determine the appropriate assets to insert in the various timeslots of the selected content. The instantiation 113 is also communicatively coupled to the COD asset insertion decision system 111 to provide the cached asset insertions thereto as described above.

A distribution node 401 is any system or device operable to interface between the headend 202 and multiple CPEs 207 for the purposes of communication. For example, the headend 202, in general, does not directly link to the CPEs 207. For a traditional cable television MSO, this generally involves a system of feeder cables and drop cables that define a number of system subsections or branches. Signals from the headend 202 may be processed by the distribution nodes 401 to insert localized content, filter locally available channels, or otherwise control the content delivered to users in the locale of a particular node. The resulting content within a node's locale is typically distributed by optical and/or coaxial links to the individual CPE 207. Each CPE 207 processes the signal from the headend 202 to display the content on the display module, such as a television, computer screen, smart phone, tablet, etc.

As shown herein, the distribution nodes 401 are aggregated into a single element for the purposes of illustration. Each distribution node 401 is coupled to a plurality of CPEs 207 to distribute the signals from the headend 202 and to process communications from the CPEs 207 to the headend 202. For example, a first distribution node 401 may be communicatively coupled to the CPEs 207-1-1-207-1-n, whereas a second distribution node 401 may be communicatively coupled to the CPEs 207-2-1-207-2-n, and so on.

In FIG. 7, the instantiation 113 of the COD asset insertion decision system 111 is operable with a headend 202 through the network 110. In this embodiment, the instantiation 113 is separate from the headend 202 and communicates therewith via the network 110. For example, the instantiation 113 of the COD asset insertion decision system 111 may be a remotely configured system that interacts with the headend 202 as described above.

The instantiation 113 may be operable to interface directly with content providers 420 and/or asset providers 421 to receive information through the network 110 regarding certain asset campaigns of the asset providers 421. For example, the content providers 420 and the asset providers 421 may negotiate to place certain assets within content from the content providers 420. The asset campaigns may be developed using certain assets from the national asset database 206 and/or the local asset database 205. Information pertaining to these negotiated asset campaigns may be conveyed to the COD asset insertion decision system 111 via the instantiation 113. The COD asset insertion decision system 111 may then use this information to synchronize the database 106.

In FIG. 8, an instantiation 113 of the COD asset insertion decision system 111 is operable with a server 430 to deliver content with inserted assets through the network 110. In this embodiment, the instantiation 113 is communicatively coupled to the server 430. Alternatively, the instantiation 113 may be implemented on the server 430. The server 430 includes the COD 203 to deliver content from the content database 204 to the CPEs 207 via the Internet or other data network. Again, the instantiation 113 of the COD asset insertion decision system 111 is operable to direct insertion of assets from the national asset database 206 and/or the local asset database 205 into the content for presentation to the users of the CPEs 207. The server 430 may be configured to receive content from the content provider(s) 420 and maintain that content within a content database 204. The server 430 may also receive assets from the asset provider(s) 421 and store that content within the local asset database 205 and the national asset database 206 as appropriate. The invention, however, is not intended to be limited to any particular manner in which the server 230 is intended to receive the content and/or the assets from their various providers.

The CPE 207 may be a computer or a mobile computing device capable of displaying video from the network 110 (e.g., via streaming video over the Internet). For example, a CPE 207 may select a desired content from an Internet website hosted with the server 430 through the network 110. Once selected, the COD 203 may retrieve the content from the content database 204 for Internet delivery to the selecting CPE 207. The instantiation 113 of the COD asset insertion decision system 111, being communicatively coupled to the COD 203, processes information pertaining to the content selection and selects assets for insertion into that content from the national asset database 206 and/or the local asset database 205. The instantiation 113 may do so based in part on the campaigns of the asset providers 421 and in a manner that provides value to the content providers 420.

Figure 9:
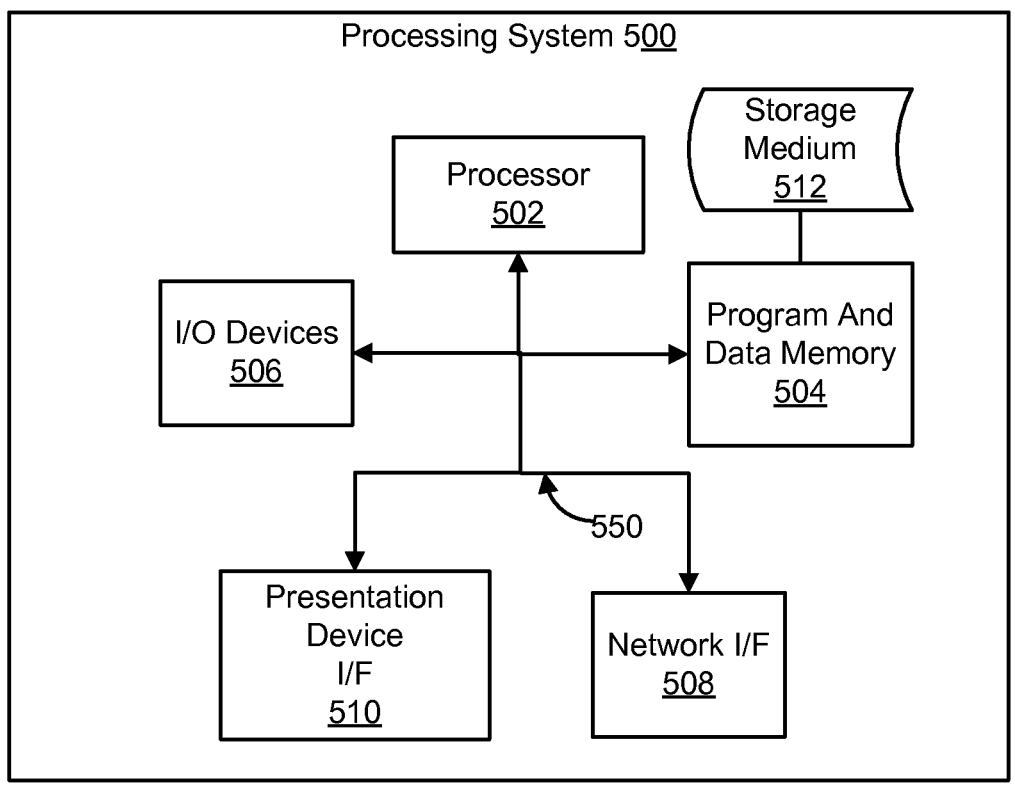
FIG. 9 is a block diagram of an exemplary processing system operable to implement a COD asset insertion decision system.

FIG. 9 is a block diagram depicting a processing system 500 also operable to provide the above features by executing programmed instructions and accessing data stored on a computer readable storage medium 512. In this regard, embodiments of the invention can take the form of a computer program accessible via the computer-readable medium 512 providing program code for use by a computer or any other instruction execution system. For the purposes of this description, computer readable storage medium 512 can be anything that can contain, store, communicate, or transport the program for use by a computer.

The computer readable storage medium 512 can be an electronic, magnetic, optical, electromagnetic, infrared, or semiconductor device. Examples of computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 500, being suitable for storing and/or executing the program code, includes at least one processor 502 coupled to memory elements 504 through a system bus 550. Memory elements 504 can include local memory employed during actual execution of the program code, bulk storage, and cache memories that provide temporary storage of at least some program code and/or data in order to reduce the number of times the code and/or data are retrieved from bulk storage during execution.

Input/output (I/O) devices 506 (including but not limited to keyboards, displays, pointing devices, etc) can be coupled to the processing system 500 either directly or through intervening I/O controllers. Network adapter interfaces 508 may also be coupled to the system to enable the processing system 500 to become coupled to other processing systems or storage devices through intervening private or public networks. Modems, cable modems, IBM Channel attachments, SCSI, Fibre Channel, and Ethernet cards are just a few of the currently available types of network or host interface adapters. Presentation device interface 510 may be coupled to the system to interface to one or more presentation devices, such as printing systems and displays for presentation of presentation data generated by the processor 502.

While the invention has been illustrated and described in detail in the drawings and foregoing description, such illustration and description is to be considered as exemplary and not restrictive in character. Certain embodiments described hereinabove may be combinable with other described embodiments and/or arranged in other ways. Accordingly, it should be understood that only the preferred embodiment and variants thereof have been shown and described and that all changes and modifications that come within the spirit of the invention are desired to be protected.

What is claimed is:

1. A system operable to direct insertion of assets in Content On Demand (COD) content across a plurality of computing devices, the system comprising:
    a database operable to maintain campaign data of the assets; and
    an asset insertion decision system operable to instantiate itself on a plurality of computing devices and to periodically access the database to provide the campaign data to the instantiations of the asset insertion decision system on the computing devices,
    wherein each instantiation of the asset insertion decision system is operable to direct insertion of a portion of the assets in COD content selections upon request and to record the asset insertions between accesses to the database, and
    wherein the asset insertion decision system is further operable to process the asset insertions recorded by the instantiations to synchronize the campaign database.

2. The system of claim 1, wherein:
    each instantiation of the asset insertion decision system is operable to process assets for insertion in the COD content selections to qualify the assets for insertion in the COD content selections, to rank the assets for insertion in the COD content selections, and to resolve conflicts of the assets selected for insertion in the COD content selections; and
    the asset insertion decision system is further operable to balance the processing of the instantiations across the computing devices.

3. The system of claim 1, wherein:
    at least one of the instantiations of the asset insertion decision system is operable to process a request for asset insertions in a COD content selection by a customer premises equipment, to identify assets that are available for insertion in the COD content selection, to determine values of the available assets to a provider of the COD content selection, to rank the available assets based on the determined values, and to direct the insertion of the one or more assets in the selected COD content based on the rank of the available assets.

4. The system of claim 1, wherein:
    at least one of the instantiations of the asset insertion decision system is operable to process a request for asset insertions in a COD content selection by a customer premises equipment to extract information of the COD content selection including a provider of the COD content selection, to communicate with the provider of the COD content selection to validate the request, to analyze the information of the COD content selection to validate assets for insertion in the COD content selection, and to remove one or more of the assets from insertion selection based on the validation of the assets.

5. The system of claim 1, wherein:
    at least one of the instantiations of the asset insertion decision system is operable to process a request for asset insertions in a COD content selection by a customer premises equipment, to identify asset timeslots within the COD content selection from the request, to determine an asset separation criteria from the assets, to determine conflicts among the assets based on the asset separation criteria to remove conflicting assets, and to select at least a portion of the remaining assets for insertion in the asset timeslots of the COD content selection.

6. The system of claim 1, wherein:
    the asset insertion decision system is further operable to establish a recording period between the accesses to the database by the asset insertion decision system.

7. A method of directing insertion of assets in Content On Demand (COD) content across a plurality of computing devices, the method comprising:
    maintaining campaign data of the assets in a database;
    instantiating an asset insertion decision system on a plurality of computing devices;
    with the asset insertion decision system, periodically accessing the database to provide the campaign data to the instantiations of the asset insertion decision system on the computing devices;
    with the instantiations of the asset insertion decision system, directing insertion of a portion of the assets in Content On Demand content selections upon request;
    recording the asset insertions directed by the instantiations between accesses to the database; and
    processing the asset insertions directed by the instantiations to synchronize the campaign database.

8. The method of claim 7, the method further comprising:
    directing at least two instantiations of the asset insertion decision system to process assets for insertion in the COD content selections; and
    balancing the processing of the at least two instantiations across the computing devices,
    wherein each of the at least two instantiations of the asset insertion decision systems is operable to qualify the assets for insertion in the COD content selections, to rank the assets for insertion in the COD content selections, to resolve conflicts of the assets selected for insertion in the COD content selections.

9. The method of claim 7, with at least one of the instantiations of the asset insertion decision system, the method further comprising:
    processing a request for asset insertions in a COD content selection by a customer premises equipment;
    identifying assets that are available for insertion in the COD content selection;
    determining values of the available assets to a provider of the COD content selection;
    ranking the available assets based on the determined values; and
    directing the insertion of the one or more assets in the selected COD content based on the rank of the available assets.

10. The method of claim 7, with at least one of the instantiations of the asset insertion decision system, the method further comprising:
    processing a request for asset insertions in a COD content selection by a customer premises equipment to extract information of the COD content selection including a provider of the COD content selection;
    communicating with the provider of the COD content selection to validate the request;

analyzing the information of the COD content selection to validate assets for insertion in the COD content selection; and removing one or more of the assets from insertion selection based on the validation of the assets.

11. The method of claim 7, with at least one of the instantiations of the asset insertion decision system, the method further comprising:

processing a request for asset insertions in a COD content selection by a customer premises equipment;

identifying asset timeslots within the COD content selection from the request;

determining an asset separation criteria from the assets;

determining conflicts among the assets based on the asset separation criteria to remove conflicting assets; and selecting at least a portion of the remaining assets for insertion in the asset timeslots of the COD content selection.

12. The method of claim 7, further comprising:

establishing a recording period between the accesses to the database by the asset insertion decision system.

13. A non transitory computer readable medium comprising instructions that, when executed by a processor, direct the processor to direct insertion of assets in Content On Demand content across a plurality of computing devices, the instructions further directing the processor to:

maintain campaign data of the assets in a database;

instantiate an asset insertion decision system on a plurality of computing devices;

with the asset insertion decision system, periodically access the database to provide the campaign data to the instantiations of the asset insertion decision system on the computing devices;

with the instantiations of the asset insertion decision system, direct insertion of a portion of the assets in Content On Demand content selections upon request;

record the asset insertions directed by the instantiations between accesses to the database; and process the asset insertions directed by the instantiations to synchronize the campaign database.

14. The computer readable medium of claim 13, further comprising instructions that direct the processor to:

direct at least two instantiations of the asset insertion decision system to process assets for insertion in the COD content selections; and balance the processing of the at least two instantiations across the computing devices, wherein each of the at least two instantiations of the asset insertion decision systems is operable to qualify the assets for insertion in the COD content selections, to rank the assets for insertion in the COD content selections, to resolve conflicts of the assets selected for insertion in the COD content selections.

15. The computer readable medium of claim 13, further comprising instructions that direct the processor to direct at least one of the instantiations of the asset insertion decision system to:

process a request for asset insertions in a COD content selection by a customer premises equipment;

identify assets that are available for insertion in the COD content selection;

determine values of the available assets to a provider of the COD content selection;

rank the available assets based on the determined values; and direct the insertion of the one or more assets in the selected COD content based on the rank of the available assets.

16. The computer readable medium of claim 13, further comprising instructions that direct the processor to direct at least one of the instantiations of the asset insertion decision system to:

process a request for asset insertions in a COD content selection by a customer premises equipment to extract information of the COD content selection including a provider of the COD content selection;

communicate with the provider of the COD content selection to validate the request;

analyze the information of the COD content selection to validate assets for insertion in the COD content selection; and remove one or more of the assets from insertion selection based on the validation of the assets.

17. The computer readable medium of claim 13, further comprising instructions that direct the processor to direct at least one of the instantiations of the asset insertion decision system to:

process a request for asset insertions in a COD content selection by a customer premises equipment;

identify asset timeslots within the COD content selection from the request;

determine an asset separation criteria from assets;

determine conflicts among the assets based on the asset separation criteria to remove conflicting assets; and selecting at least a portion of the remaining assets for insertion in the asset timeslots of the COD content selection.

18. The computer readable medium of claim 13, further comprising instructions that direct the processor to:

establish a recording period between the accesses to the database by the asset insertion decision system.

* * * * *